S. G. BARNARD.
DRAW BAR.
APPLICATION FILED JULY 20, 1916.
1,203,457.
Patented Oct. 31, 1916.
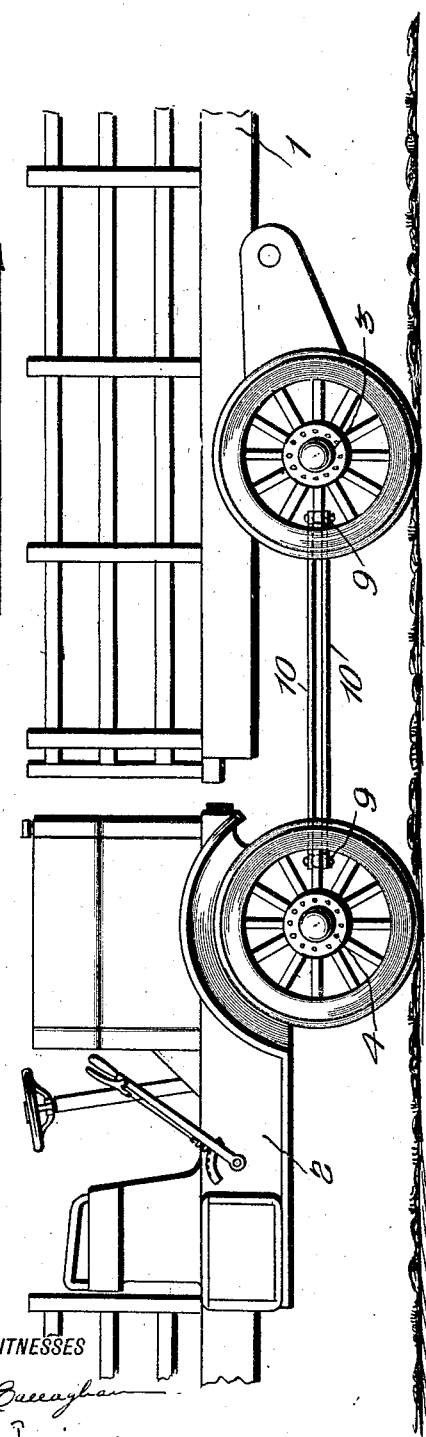
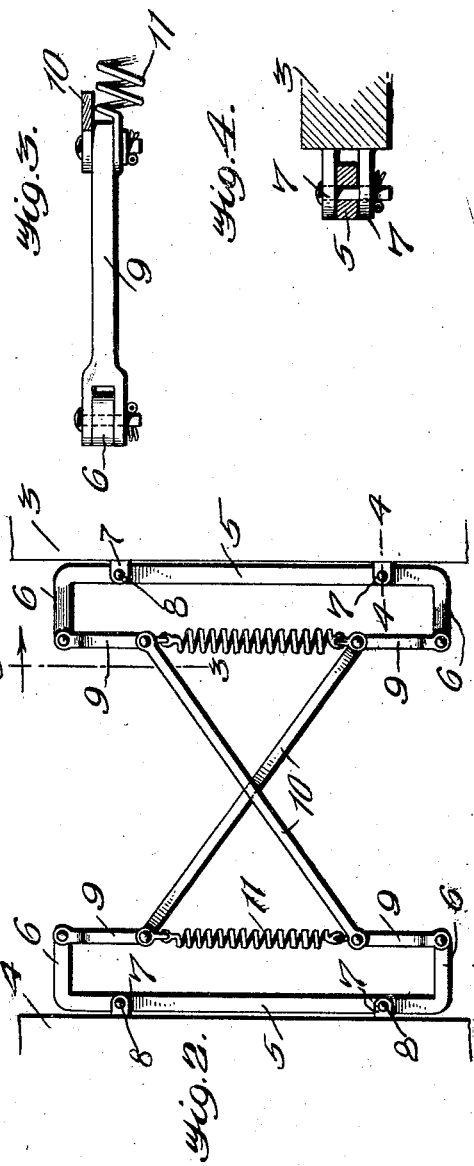
WITNESSES
INVENTOR
SAMUEL G. BARNARD,
BY
ATTORNEYS

UNITED STATES PATENT OFFICE.

SAMUEL GUTHRIE BARNARD, OF SEATTLE, WASHINGTON.

DRAW-BAR.

1,203,457.

Specification of Letters Patent.

Patented Oct. 31, 1916.

Application filed July 20, 1916. Serial No. 110,300.

*To all whom it may concern:*

Be it known that I, SAMUEL G. BARNARD, a citizen of the United States, and a resident of Seattle, in the county of King and State of Washington, have invented an Improvement in Draw-Bars, of which the following is a specification.

My invention is an improvement in draw bars, for vehicle trailers, and has for its object to provide a device of the character specified, which may be easily attached to or detached from the vehicles, and which will be simple in construction, and will connect the vehicles in such manner that they will be cushioned against each other.

In the drawings: Figure 1 is a side view of portions of two vehicles showing the draw bar in use. Fig. 2 is a top plan view of the draw bar. Figs. 3 and 4 are sections on the lines 3—3 and 4—4, respectively, of Fig. 2, the former looking in the direction of the arrow adjacent to the line.

The present embodiment of the invention is shown in connection with a front or live truck 1 and a rear truck or trailer 2, and the attachment is arranged between the rear axle 3 of the truck 1, and the front axle 4 of the truck 2.

The draw bar comprises a pair of yoke-shaped members, each consisting of a body 5 having arms 6 at its ends, and the bodies of the yokes are adapted for connection with the lugs 7 on the axles 3 and 4. The yokes have openings, which register with openings in the lugs, and pins 8 are passed through the registering openings, the pins being prevented from disengagement by cotter pins.

A lever 9 is pivoted to each arm 6 of each yoke, and each lever is connected to the opposite lever of the other yoke by a link 10, the links crossing, as shown. A coil spring 11 is arranged between the levers of each yoke, the springs acting normally to hold the levers in alinement. In use, when traction is exerted on the yoke connected with the live truck, the inertia of the trailer will tend to straighten the links and levers into alinement. That is, the traction will tend to draw each link into alinement with the levers to which it is connected. The springs 11, however, resist this tendency, and act to return the parts to the position in Fig. 2, that is with the levers in alinement.

When the rear truck moves toward the front truck, there is a tendency to increase the angle between the links and levers, and the springs are again placed under tension. Thus movement of the trucks toward or from each other is cushioned by the same spring 11.

It will be understood that the trucks 1 and 2 are four wheeled trucks, the front portion of the truck 1 and the rear portion of the truck 2 being omitted for the sake of convenience. When used with a trailer, it will be understood that if the said truck has steering gear, it must be released, and when so released the trucks will track.

I claim:

1. A draw bar for vehicle trailers, comprising a pair of yoke-shaped members each consisting of a body adapted for connection with the axle of a vehicle, and arms extending laterally from the body, a lever pivoted to each arm, a link connecting each lever of one yoke with the opposite lever of the other yoke, said levers crossing, and springs arranged between and connecting the levers of each yoke and tending to aline the said levers.

2. A draw bar for vehicle trailers comprising a pair of rigid members for connection with vehicles to extend transversely of the length thereof, a lever pivoted to each end of each member, a pair of crossed links, said links being pivoted to the levers, and a spring arranged between each pair of levers tending to aline said levers.

SAMUEL GUTHRIE BARNARD.

Witnesses:
K. JONES,
J. C. IRVINE.

Copies of this patent may be obtained for five cents each, by addressing the "Commissioner of Patents, Washington, D. C."